(12) United States Patent
Casale

(10) Patent No.: US 6,402,019 B1
(45) Date of Patent: Jun. 11, 2002

(54) METHOD OF FITTING CLOSURE OPENING DEVICES TO RESPECTIVE SEALED PACKAGES FOR POURABLE FOOD PRODUCTS, AND PACKAGES FEATURING SUCH DEVICES

(75) Inventor: Cristiano Casale, Spilamberto (IT)

(73) Assignee: Tetra Laval Holdings & Finance S.A., Pully (CH)

( * ) Notice: Subject to any disclaimer, the term of this patent is extended or adjusted under 35 U.S.C. 154(b) by 0 days.

(21) Appl. No.: 09/583,741

(22) Filed: May 31, 2000

(30) Foreign Application Priority Data

Aug. 27, 1999 (EP) .............................. 99830533

(51) Int. Cl.[7] .............................. B65D 43/02; B65B 7/28
(52) U.S. Cl. ............... 229/123.2; 220/258; 229/125.14; 229/125.15; 53/133.2; 53/329.2; 53/485
(58) Field of Search ..................... 229/123.2, 125.14, 229/125.15; 220/258, 288, 359.1; 493/87, 102, 374, 393; 53/133.2, 329, 329.2, 478, 485

(56) References Cited

U.S. PATENT DOCUMENTS

| | | | |
|---|---|---|---|
| 4,109,814 A | 8/1978 | Rausing | |
| 4,140,235 A | 2/1979 | Rausing et al. | |
| 4,359,169 A | * 11/1982 | Helms et al. | .......... 229/125.14 |
| 4,813,578 A | 3/1989 | Gordon et al. | |
| 5,058,360 A | * 10/1991 | Yamazaki et al. | ......... 53/133.2 |
| 5,065,938 A | * 11/1991 | Anderson | .................... 220/258 |
| 5,069,385 A | 12/1991 | Farber | |
| 5,110,040 A | * 5/1992 | Kalberer et al. | ............. 220/288 |
| 5,110,041 A | * 5/1992 | Keeler | ................... 229/125.15 |
| 5,564,603 A | 10/1996 | Malmberg | |
| 5,620,550 A | 4/1997 | Andersson et al. | |
| 5,624,528 A | 4/1997 | Abrams et al. | |
| 5,759,319 A | * 6/1998 | Moody et al. | ................. 493/87 |
| 5,893,477 A | 4/1999 | Kaneko et al. | |
| 5,947,318 A | 9/1999 | Palm | |
| 5,992,636 A | 11/1999 | Mock et al. | |
| 6,003,713 A | 12/1999 | Derving | |

FOREIGN PATENT DOCUMENTS

| | | |
|---|---|---|
| DE | 297 16 230 | 1/1998 |
| DE | 196 35 089 | 3/1998 |
| EP | 0 331 798 | 9/1989 |

* cited by examiner

*Primary Examiner*—Gary E. Elkins
(74) *Attorney, Agent, or Firm*—Burns, Doane, Swecker & Mathis, L.L.P.

(57) ABSTRACT

A method of fitting a closable opening device (2, 2') to a sealed pourable food product package (1, 1'), the method including the steps of heat sealing a frame (15, 56) of the opening device (2, 2') about a removable portion (10a, 70a) of the package (1, 1'), and heat sealing a cap (17, 58) of the opening device (2, 2') directly to the removable portion (10a, 70a).

15 Claims, 5 Drawing Sheets

METHOD OF FITTING CLOSURE OPENING DEVICES TO RESPECTIVE SEALED PACKAGES FOR POURABLE FOOD PRODUCTS, AND PACKAGES FEATURING SUCH DEVICES

FIELD OF THE INVENTION

The present invention relates to a method of fitting closable opening devices to respective sealed packages for pourable food products, and to packages featuring such devices.

BACKGROUND OF THE INVENTION

Many pourable food products, such as fruit juice, UHT (ultra-high-temperature processed) milk, wine, tomato sauce, etc., are sold in packages made of sterilized packaging material.

A typical example of such a package is the parallelepipedal package for liquid or pourable food products known as Tetra Brik Aseptic (registered trademark), which is formed by folding and sealing laminated strip packaging material. The packaging material has a multilayer structure comprising a layer of fibrous material, e.g. paper, covered on both sides with heat-seal plastic material, e.g. polyethylene; and, in the case of aseptic packages for long-storage products, such as UHT milk, the packaging material comprises a layer of oxygen-barrier material, defined for example by an aluminium film, which is superimposed on a layer of heat-seal plastic material and is in turn covered with another layer of heat-seal plastic material forming the inner face of the package eventually contacting the food product.

As is known, such packages are produced on fully automatic packaging machines, on which a continuous tube is formed from the strip-fed packaging material; the strip of packaging material is sterilized on the packaging machine, e.g. by applying a chemical sterilizing agent, such as a hydrogen peroxide solution; following sterilization, the sterilizing agent is removed, e.g. vaporized by heating, from the surfaces of the packaging material; and the strip of packaging material so sterilized is kept in a closed sterile environment, and is folded and sealed longitudinally to form a vertical tube.

The tube is then filled with the sterilized or sterile-processed food product, and is sealed and cut at equally spaced cross sections into pillow packs, which are subsequently folded mechanically to form finished, e.g. substantially parallelepipedal, packages.

Alternatively, the packaging material may be cut into blanks, which are formed on forming spindles into packages which are then filled with the food product and sealed. One example of such a package is the so-called "gable-top" package known as Tetra Rex (registered trademark).

Packages of the above type are normally provided with closable opening devices by which to pour, and prevent external agents from coming into contact with, the food product in the package.

Such opening devices substantially comprise a frame defining an opening and fitted to a hole or a punch-through or pull-off portion in a wall of the package; and a cap hinged to the frame.

The cap is normally molded integrally with the frame, and is originally sealed to the frame, along a peripheral edge about the opening, by a thin breakable annular connecting portion. Once unsealed, the cap is movable between a closed position, cooperating in airtight manner with the frame, and an open position.

Alternatively, threaded caps are used, which are separate from and originally screwed to the frame, and which are normally molded integrally with respective tamper-evidence rings connected coaxially to the caps by breakable radial connecting portions.

The above caps are pressed onto the respective frames so that the respective tamper-evidence rings click onto respective annular base flanges of the frames and past the thread portions of the frames close to the flanges.

One problem posed by the opening devices described lies in the cap having to be easily detachable from the frame when unsealing the package. For which purpose, the opening device is made of low-break-strength plastic material, normally polyethylene.

As polyethylene, however, is a poor oxygen barrier, the side of the packaging material eventually forming the inside of the package must be fitted, over the hole, with an additional "patch" defined by a small sheet of heat-seal plastic material, and the opposite side of the packaging material must be fitted with an oxygen-barrier member, e.g. a pull-off tab, heat sealed to the patch and comprising a layer of aluminium.

Providing barrier members and patches calls for additional processing of the packaging material before the material is sterilized and folded and sealed to form the vertical tube, thus increasing the manufacturing time and cost of the package. More specifically, the packaging material must be fed successively through a cutting station for forming the holes; a first sealing station for applying the patches; and a second sealing station for applying the barrier members to the respective patches.

Moreover, besides opening the cap, the user also has to remove the barrier member to open the package.

SUMMARY OF THE INVENTION

It is an object of the present invention to provide a method of fitting a closable opening device to a sealed package for pourable food products, designed to eliminate the aforementioned drawbacks typically associated with known methods.

According to the present invention, there is provided a method of fitting a closable opening device to a sealed pourable food product package having at least one removable portion; said opening device comprising a frame defining a pour opening, and a removable cap fitted to said frame to close said opening; said method comprising the step of causing said frame to adhere to said package about said removable portion; and being characterized by also comprising the step of causing said cap to adhere directly to said removable portion of said package.

The present invention also relates to a sealed pourable food product package having at least one removable portion and provided with a closable opening device, which comprises a frame defining a pour opening and fitted to the package about said removable portion, and a removable cap fitted to said frame to close said opening; characterized in that said cap comprises an anchoring portion fixed directly to said removable portion.

DESCRIPTION OF THE DRAWINGS

A number of preferred non-limiting embodiments of the present invention will be described by way of example with reference to the accompanying drawings, in which.

DETAILED DESCRIPTION OF THE INVENTION

Figure 1:
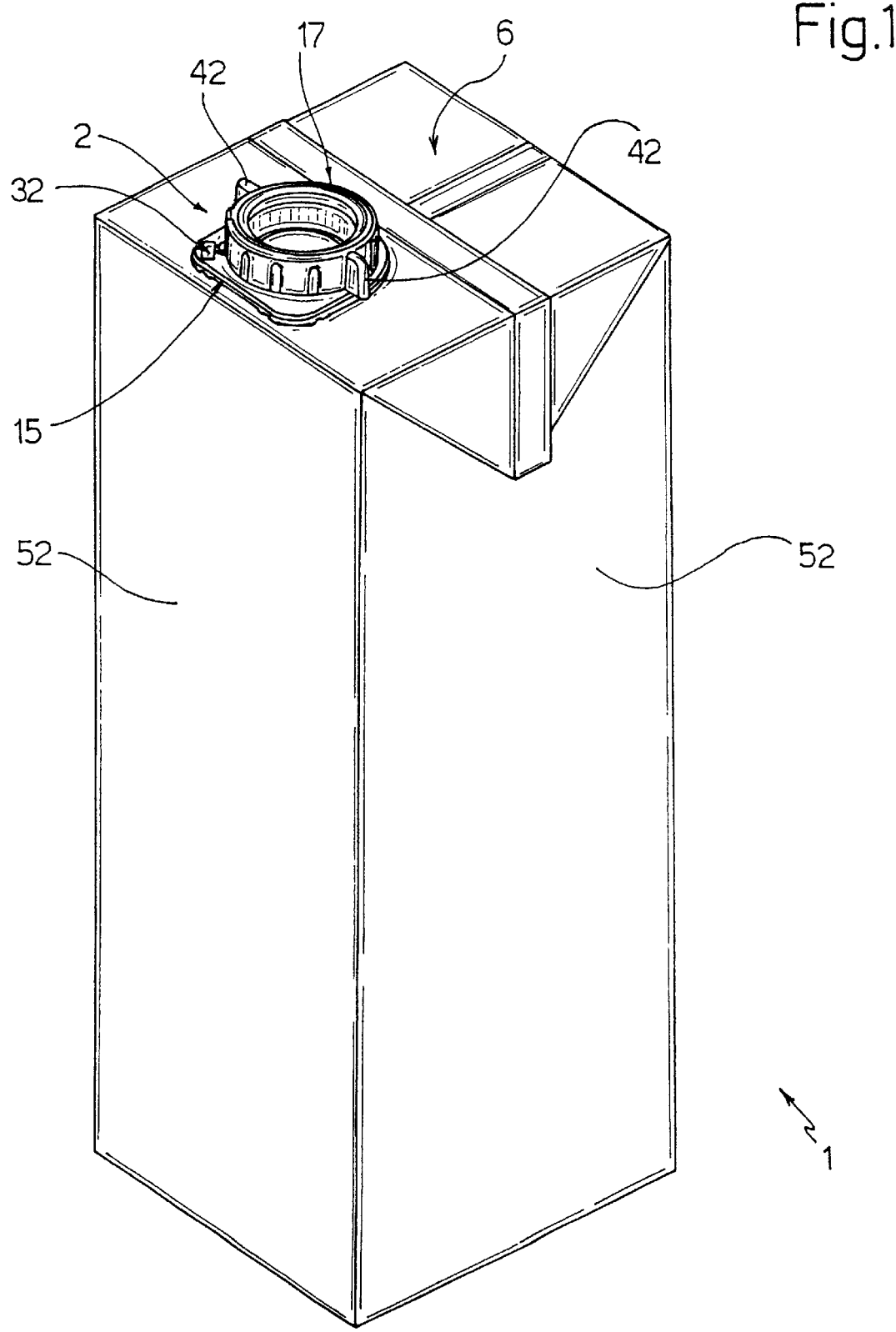
FIG. 1 shows a view in perspective of a sealed pourable food product package featuring a closable opening device in accordance with the present invention.

Number 1 in FIG. 1 indicates as a whole an aseptic sealed package for pourable food products, e.g. a parallelepipedal package known as Tetra Brik Aseptic (registered trademark), which is made from sheet packaging material as described in detail previously, and comprises a closable opening device 2 (FIGS. 1, 3, 4) made of plastic material and fitted to package 1 by means of a heat-seal unit 3 (FIG. 5) operating according to the method of the present invention.

Figure 2:
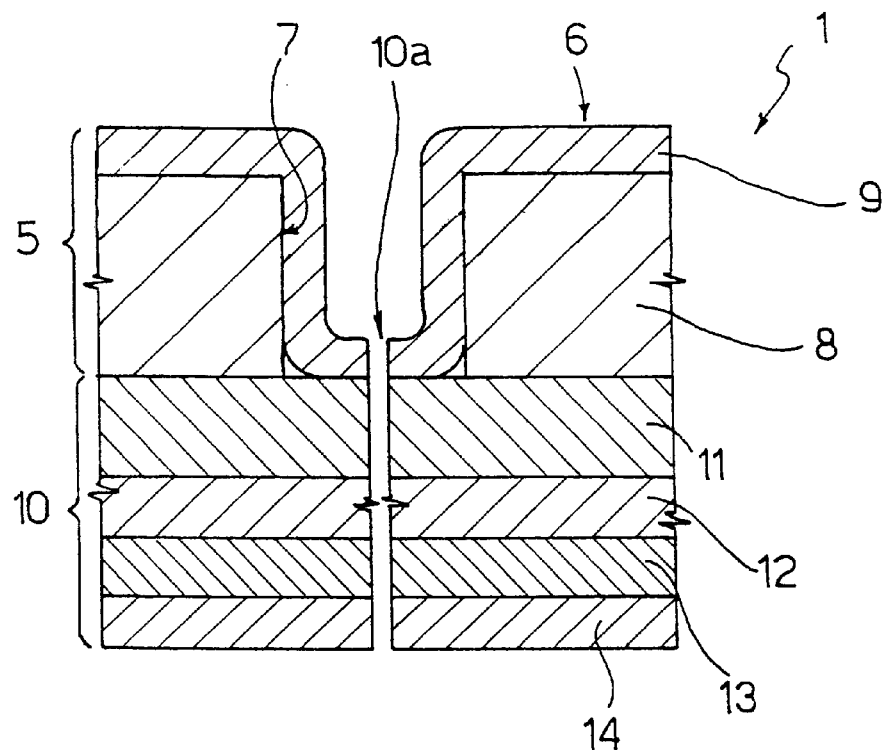
FIG. 2 shows a larger-scale section, illustrating the component layers, of a portion of the FIG. 1 package prior to application of the respective opening device.

The packaging material (FIG. 2) from which package 1 is made has a multilayer structure, and comprises a main sheet 5 having a hole 7 at a top wall 6 of package 1, and defined by a layer 8 of fibrous material, e.g. paper, covered, on the side defining the outer face of package 1, with a film 9 of heat-seal plastic material—in the example shown, polyethylene.

On the side defining the inner face of package 1, main sheet 5 is also covered with a lamination sheet 10, a removable portion 10a of which covers hole 7.

Lamination sheet 10 comprises a film 12 of oxygen-barrier material, e.g. an aluminium film, which is covered, on the side facing fibrous material layer 8, with a film 11 of heat-seal plastic material, e.g. polyethylene, and, on the opposite side, with an adhesive layer 13 and a further film 14 of heat-seal plastic material, normally polyethylene, defining the inner face of package 1.

Figure 3:
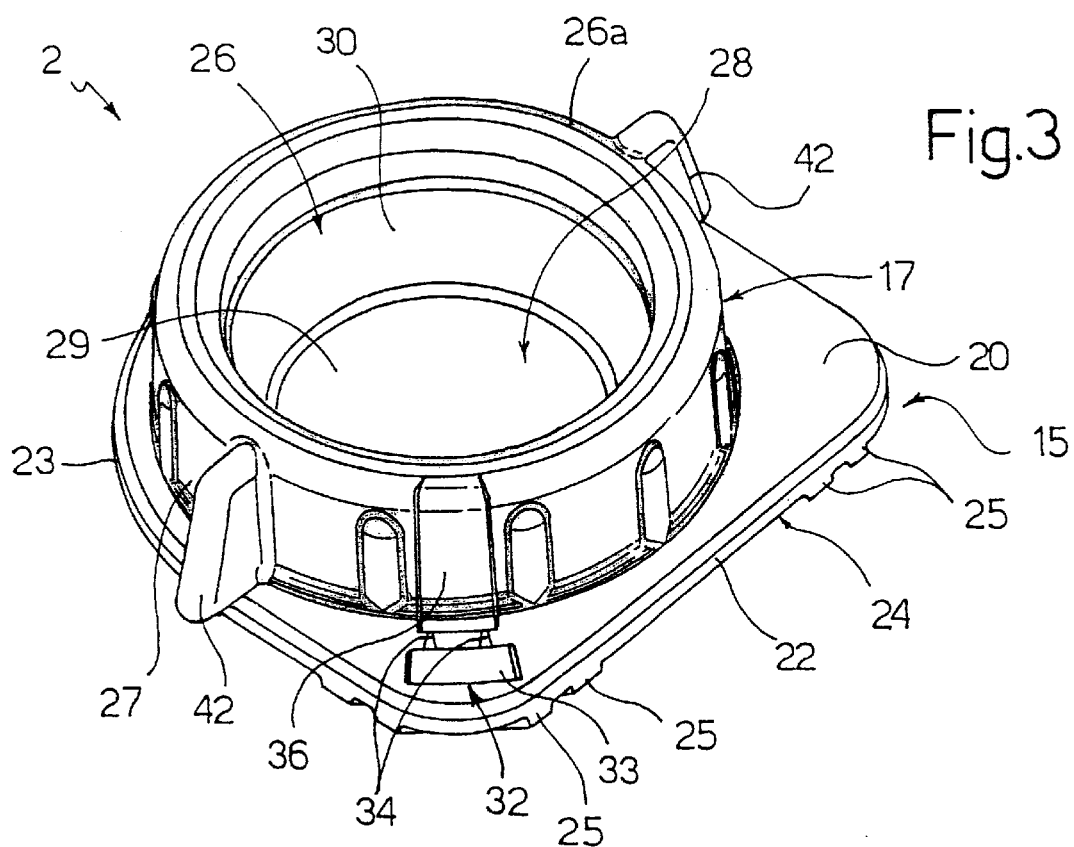
FIG. 3 shows a larger-scale view in perspective of the FIG. 1 opening device.
Figure 4:
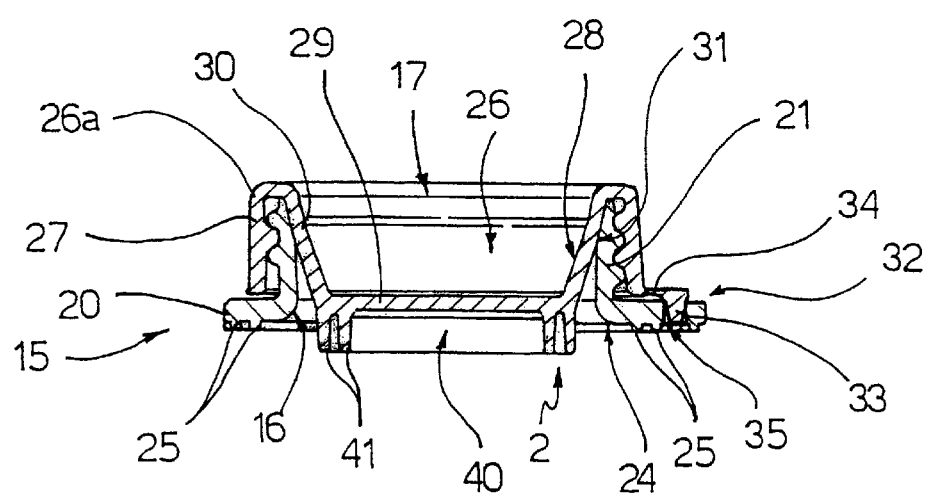
FIG. 4 shows a larger-scale cross section of the FIG. 1 opening device.

With reference to FIGS. 1, 3 and 4, opening device 2 comprises an annular frame 15 fixed to wall 6 of package 1, about hole 7, and defining a circular opening 16 through which to pour out the food product; and a cap 17 formed separately from frame 15 and which is fitted to frame 15 to close opening 16.

More specifically, frame 15 comprises an annular flange 20 heat sealed to wall 6 of package 1 and internally defining opening 16; and an externally threaded, cylindrical, annular portion 21 projecting from a lateral edge of opening 16.

More specifically, flange 20 is defined externally by a straight edge 22 and a curved U-shaped edge 23 connected to each other, and comprises, on a bottom surface 24, a number of ribs 25 defining the additional plastic material which, when melted during heat sealing, adheres to surface film 9 of main sheet 5 of wall 6 of package 1.

Cap 17 comprises, integrally, a portion 26 closing opening 16; and an internally threaded, cylindrical, annular portion 27 projecting from a circular outer peripheral edge 26a of portion 26 and which screws onto annular portion 21 of frame 15.

More specifically, portion 26 defines a cavity 28 flaring slightly and facing away from the side fitted to frame 15, and comprises a circular bottom wall 29, and a truncated-cone-shaped lateral wall 30 which tapers towards bottom wall 29 and defines, at the top, the peripheral edge 26a from which annular portion 27 extends coaxially with, and in a radially outer position with respect to, lateral wall 30.

Annular portion 27 and truncated-cone-shaped lateral wall 30 together define a seat 31 for receiving annular portion 21 of frame 15, and which decreases in section towards peripheral edge 26a.

Cap 17 is originally fixed to frame 15 in a closed position, in which seat 31 is engaged in airtight manner by annular portion 21, by means of breakable tamper-evidence means 32.

Tamper-evidence means 32 comprise a block 33 made of plastic material and which is connected externally and laterally to cap 17 by means of two thin, low-break-strength strips 34, engages a through hole 35 formed in flange 20 of frame 15, and is heat sealed to the lateral edge of hole 35 and to surface film 9 of wall 6 of package 1.

More specifically, block 33 is substantially in the form of a triangular prism, and is connected integrally, by means of strips 34 and along a lateral edge of its own, to a projection 36 projecting radially outwards from portion 27 of cap 17.

Preferably, cap 17 is originally pressed onto frame 15, after first aligning block 33 with hole 35 in frame 15; or may be screwed onto frame 15, so as to align block 33 with hole 35, and then pressed on.

Once unsealed, cap 17 is movable between the above closed position, and an open position detached from frame 15.

An important aspect of the present invention is that cap 17 also comprises a cylindrical, annular anchoring portion 40 extending from the peripheral edge of bottom wall 29, on the opposite side to lateral wall 30, and which projects through opening 16 in the closed position and is heat sealed by unit 3 directly to portion 10a of lamination sheet 10 covering hole 7, with the interposition of surface film 9 of heat-seal plastic material.

More specifically, anchoring portion 40 is defined by two concentric, closely spaced, projecting annular edges 41.

Cap 17 also comprises, integrally, two radial tabs 42, each substantially in the form of a right trapezium, and which assist in screwing and unscrewing cap 17 on and off frame 15.

Figure 5:
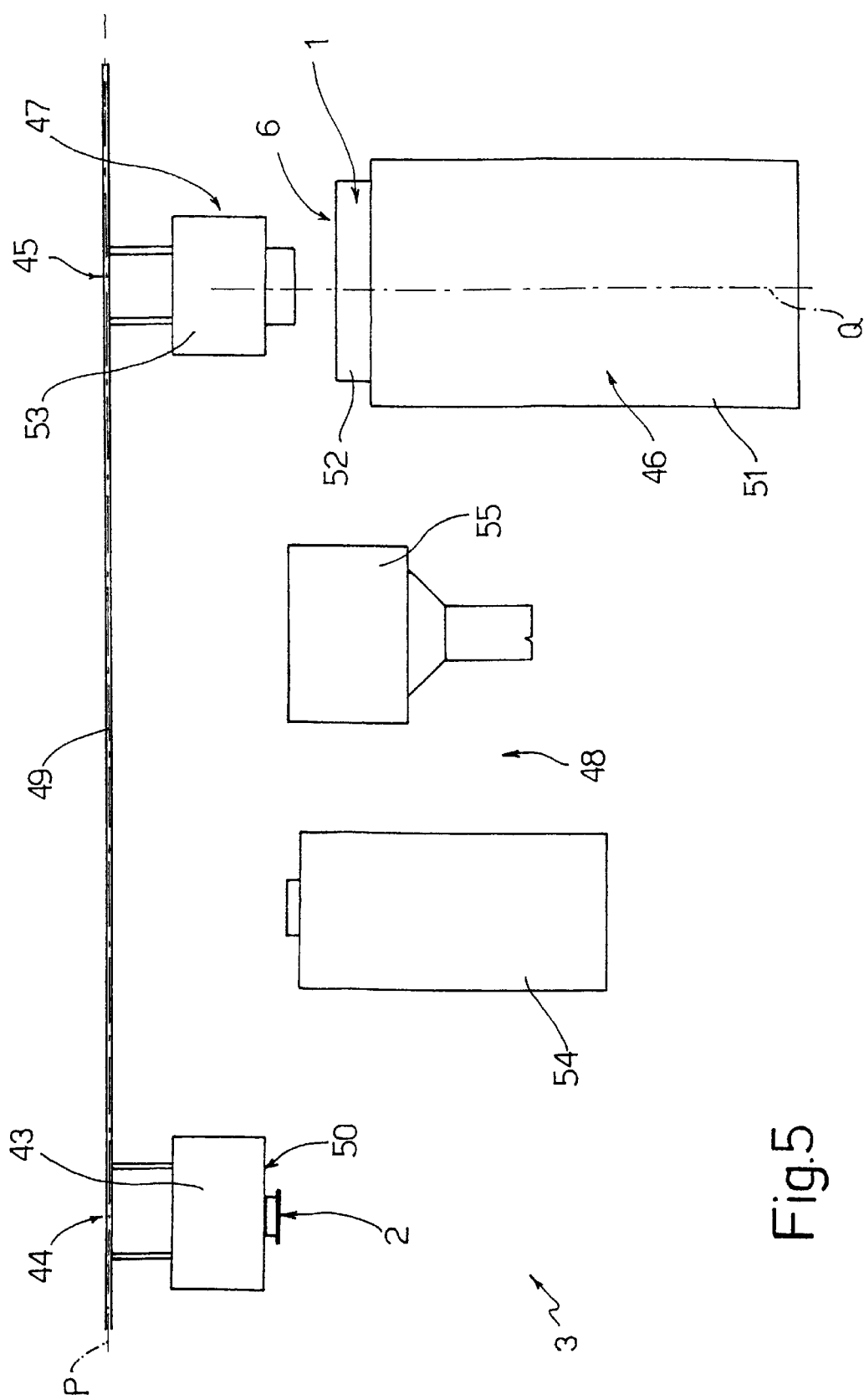
FIG. 5 shows a schematic plan view of a heat-seal unit operating according to the method of the present invention to fit closable opening devices to respective packages.

With reference to FIG. 5, heat-seal unit 3 comprises a fitting head 43 which receives one opening device 2 at a time at an input station 44 and is movable along a straight path P to transfer opening device 2 to a heat-seal station 45 where opening device 2 is fitted to a respective package 1; a gripping assembly 46 which receives one package 1 at a time and is movable along a path Q, crosswise to path P, to feed package 1 into heat-seal station 45 and into contact with a respective opening device 2; and a first and second heating assembly 47, 48 interacting respectively with opening devices 2 and packages 1 along respective paths P and Q upstream from heat-seal station 45.

More specifically, fitting head 43 is mounted to run along a straight guide 49 defining path P, and, by means of suction, retains one opening device 2 at a time, on the cap 17 side, contacting a respective front face 50.

Gripping assembly 46 comprises four plates 51 (only one shown in FIG. 5) arranged in two parallel pairs to define a rectangular-section seat for receiving a respective package 1, which is positioned with top wall 6 projecting with respect to plates 51 and facing guide 49 to receive a respective opening device 2.

By virtue of known actuating means (not shown) plates 51 are gripped onto respective lateral walls 52 of package 1 so that, by virtue of the noncompressible nature of the food product in package 1, wall 6 swells outwards to assist application of respective opening device 2.

Assembly 47 comprises an air heating member 53 mounted to run along guide 49 and movable, by known actuating means (not shown), between a work position—in which the heating member is positioned facing wall 6 of package 1 between plates 51 of gripping assembly 46, and blows hot air onto the portion of wall 6 for receiving respective opening device 2—and a rest position—in which the heating member is withdrawn away from package 1 to enable fitting head 43 to move into heat-seal station 45.

Assembly 48 comprises an air preheating member 54 and a microflame burner 55, both positioned facing guide 49 and located in series along path P, between input station 44 and heat-seal station 45. More specifically, burner 55 is defined by a heating plate shaped to reproduce the outer contour of frame 15 of opening device 2, and comprising a number of holes (not shown in FIG. 5) through which hydrogen is emitted.

Operation of unit 3 will be described with reference to one package 1 and one opening device 2, and as of a start condition in which package 1 is housed between plates 51 of gripping assembly 46, and opening device 2 is retained by suction on front face 50 of fitting head 43 at input station 44.

Fitting head 43 is moved along path P to position opening device 2 facing preheating member 54, where opening device 2 remains for a predetermined time T1—preferably 0.4 of a second—and is subjected to a hot-air jet conveniently at a temperature of 450° C.

At the end of the above operation, fitting head 43 is moved along path P to bring opening device 2 up to burner 55, where opening device 2 remains for a predetermined time T2—in the example shown, equal to 0.3 of a second.

At the same time, heating member 53, in the work position, is activated to direct a hot-air jet, conveniently at a temperature of 500° C., onto the portion of wall 6 of package 1 for receiving opening device 2. This operation lasts a predetermined time T3, at most equal to the time taken by fitting head 43 to move from input station 44 to heat-seal station 45, and, in the example shown, equal to 0.8 of a second.

On being restored to the rest position, heating member 53 is replaced at heat-seal station 45 by fitting head 43. At which point, gripping assembly 46 is moved along path Q to bring wall 6 of package 1 into contact with opening device 2, against which wall 6 is pressed for a given time T4—necessary to effect adhesion and, in the example shown, equal to 1 second—and with a force preferably ranging between 3.5 and 3.9 N.

At this stage, the partially melted plastic material of frame 15 and that of anchoring portion 40 of cap 17 adhere respectively to surface film 9 of main sheet 5 about hole 7, and, via the interposition of film 9, to portion 10a of lamination sheet 10 covering hole 7; and, at the same time, block 33 is sealed to flange 20 of frame 15, along the lateral edge of hole 35, and to surface film 9 of main sheet 5 of wall 6 of package 1.

In actual use, package 1 is unsealed using tabs 42 to rotate cap 17 with respect to frame 15 and break strips 34 connecting block 33 to cap 17. As it rotates, cap 17 retains portion 10a of lamination sheet 10 covering hole 7 and sealed to anchoring portion 40, so as to detach portion 10a from the rest of wall 6 and so uncover hole 7.

Figure 6:
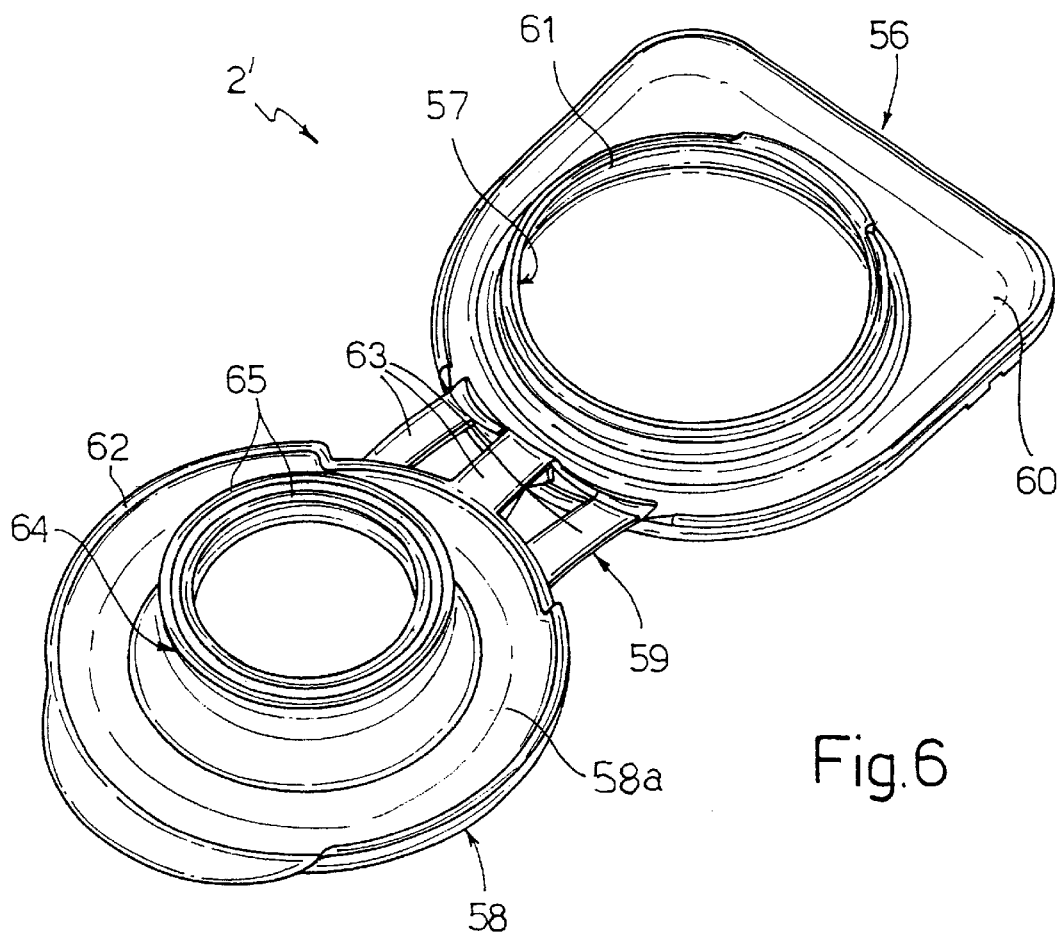
FIG. 6 shows a view in perspective, and in the open position, of a further embodiment of a closable opening device in accordance with the present invention.
Figure 7:
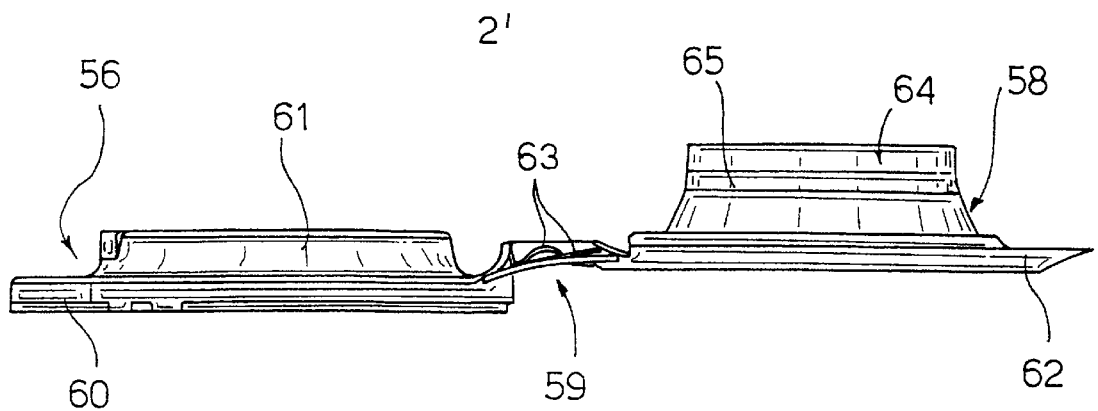
FIG. 7 shows a side view of the FIG. 6 opening device.

Unit 3 also provides for fitting packages 1 with closable opening devices other than the one described above, and of the type, for example, indicated as a whole by 2' in FIGS. 6 and 7.

Opening device 2' comprises an annular frame 56 identical with frame 15 of opening device 2, and which defines a circular opening 57 through which to pour the food product and is fitted by unit 3 about hole 7 on top wall 6 of package 1; and a cap 58 connected to frame 56 by a lateral hinge 59.

More specifically, frame 56 comprises an annular flange 60 which has the same outer contour as flange 20 of frame 15, is heat sealed to wall 6 of package 1, and has a raised edge 61 defining opening 57.

Cap 58 is molded integrally with frame 56 and is defined by a circular disk-shaped body 58a defined by a raised peripheral edge 62 originally sealed to edge 61 of frame 56.

Once unsealed, cap 58 is movable between a closed position—in which edge 62 cooperates in airtight manner with edge 61 of frame 56—and an open position.

Hinge 59 is defined by a number of tongues 63—three in the example shown—extending integrally between a portion of edge 62 of cap 58 and a lateral end of flange 60.

As in opening device 2, cap 58 has a cylindrical, annular anchoring portion 64 which projects from a central portion of disk-shaped body 58a, projects through opening 57 in frame 56 in the closed position, is heat sealed, via the interposition of film 9, to portion 10a of lamination sheet 10 covering hole 7, and is defined by two closely spaced, concentric annular walls 65.

In this case, in place of film 12 of heat-seal plastic material, lamination sheet 10 comprises a layer of adhesive (not shown) for improving adhesion between film 11 of barrier material and surface film 9 of main sheet 5 at hole 7, and so preventing detachment of films 9 and 11 due to tensile stress when unsealing cap 58.

Opening device 2' is fitted to package 1 in exactly the same way as opening device 2.

Figure 8:
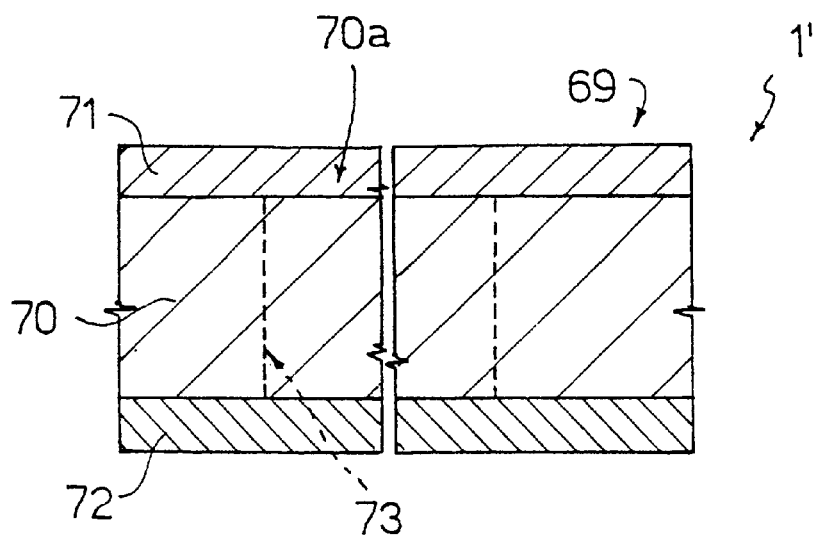
FIG. 8 shows a larger-scale section, illustrating the component layers, of a portion of a further embodiment of a sealed pourable food product package fittable with the opening devices in FIGS. 3, 4 and 6, 7.

Alternatively, opening devices 2, 2' may advantageously be fitted by heat-seal unit 3 to packages other than the one described, e.g. to nonaseptic packages for pourable food products such as pasteurized milk, one example of which is shown partly and schematically in FIG. 8 and indicated as a whole by 1'.

The material from which package 1' is made has a multilayer structure, and comprises a layer 70 of fibrous material, e.g. paper, covered on both sides with respective films 71, 72 of heat-seal plastic material, e.g. polyethylene, and having, on a wall 69 of package 1', a removable portion 70a defined by a preferential tear line 73 in turn defined by a succession of perforations.

In this case, frames 15, 56 of opening devices 2, 2' are heat sealed about removable portion 70a of package 1', and anchoring portions 40, 64 of caps 17, 58 are heat sealed directly to removable portion 70a with the interposition of film 71 of heat-seal plastic material.

The advantages of the present invention will be clear from the foregoing description of packages 1, 1' and opening devices 2, 2' fitted to the packages in accordance with the method of the present invention.

In particular, fitting caps 17, 58 directly to removable portions 10a, 70a of packages 1, 1' provides for dispensing with additional barrier members and patches, thus drastically reducing production cost by reducing the number of operations to be performed on the sheet packaging material before the material is folded, sealed and cut to form packages 1, 1'.

Moreover, packages 1, 1' are unsealed by the user simply acting on caps 17, 58, which provides, in one operation, for detaching caps 17, 58 from respective frames 15, 56 and removing respective removable portions 10a, 70a of packages 1, 1'.

Clearly, changes may be made to packages, 1, 1', to opening devices 2, 2', and to unit 3 as described and illustrated herein without, however, departing from the scope of the accompanying Claims.

In particular, opening devices 2, 2' may be fitted to respective packages 1, 1' using other fastening systems, e.g. adhesive substances.

What is claimed is:

1. A method of fitting a closable opening device over a removable portion of a sealed pourable food product package; said opening device comprising a frame defining a pour opening, and a removable cap fitted to said frame to close said opening; the method comprising the step of adhering said frame to said package about said removable portion; and the step of causing said cap to adhere directly to said removable portion of the package, and wherein said adhering steps are performed by heat sealing, including heating the opening device, and separately heating said package at least at the portion to which said cap is fitted, and including maintaining contact between said opening device and said package for a predetermined time.

2. A method as claimed in claim 1, wherein said removable portion comprises at least one film of oxygen-barrier material.

3. A method as claimed in claim 2, wherein said barrier material comprises aluminum.

4. A method as claimed in claim 1, wherein said removable portion comprises at least one layer of fibrous material, and is defined by a preferential tear line.

5. Amended) A method as claimed in claim 1, wherein said steps of causing said frame and said cap to adhere to said package are performed simultaneously.

6. A method as claimed in claim 1, wherein said step of heating said opening device is performed in two successive operations.

7. A method of applying a closable opening device to a package, the method comprising:
   (a) providing a package having a multilayer structure including a fibrous layer in a multilayer structure having an opening and a heat sealable layer extending over the opening,
   (b) providing a heat sealable opening device,
   (c) heating the opening device at a first station,
   (d) advancing the opening device to a second station and applying heat to the opening device at the second station,
   (e) applying heat to the package at a third station,
   (f) advancing the opening device to the third station, and
   (g) pressing the heated opening device and the package together with the opening device aligned with the opening.

8. The method as claimed in claim 7, wherein the opening device includes a frame and a cap, and heat sealing the cap to the heat sealable layer, whereby upon lifting the cap relative to the frame causes the heat sealable layer to break thereby allowing the contents of the package to be poured through the opening.

9. A sealed pourable food product package having at least one removable portion and provided with a closable opening device, comprising a frame defining a pour opening and fitted to the package about said removable portion, and a removable cap fitted to said frame to close said opening, said cap including an anchoring portion fixed directly to said removable portion including at least one film of oxygen-barrier material, and wherein said package is made of a multilayer structure having at least one layer of fibrous material having a through hole and covered at least on one side with a lamination sheet which includes said film of oxygen barrier material, which covers said hole and defines said removable portion of said hole.

10. A package as claimed in claim 9, wherein said anchoring portion extends through said opening in said frame.

11. A package as claimed in claim 9, wherein said barrier material comprises aluminum.

12. A package as claimed in claim 9, wherein said frame and said cap have respective mutually engaging threads; and wherein said film of barrier material of said lamination sheet is covered, on the side facing said layer of fibrous material, with a film of heat-seal plastic material.

13. A package as claimed in claim 9, wherein said cap is connected to said frame by a hinge; and wherein said film of barrier material of said lamination sheet is covered, on the side facing said layer of fibrous material, with a layer of adhesive.

14. A package as claimed in claim 9, wherein the packaging material includes at least one layer of fibrous material; and said removable portion is defined by a portion of said layer of fibrous material and is defined by a preferential tear line.

15. A package as claimed in claim 9, wherein said frame and said cap are heat sealed to said package.

* * * * *